(12) United States Patent
Liang et al.

(10) Patent No.: US 8,724,253 B1
(45) Date of Patent: May 13, 2014

(54) DISK DRIVE ADJUSTING DEMODULATION WINDOW FOR SPIRAL TRACK USING TIMING FEED-FORWARD COMPENSATION

(75) Inventors: Jiangang Liang, San Jose, CA (US); Siri S. Weerasooriya, Campbell, CA (US); Brian P. Rigney, Louisville, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 25 days.

(21) Appl. No.: 13/431,655

(22) Filed: Mar. 27, 2012

(51) Int. Cl.
*G11B 5/596* (2006.01)
(52) U.S. Cl.
USPC .................. 360/77.04; 360/77.07; 360/75
(58) Field of Classification Search
USPC ......... 360/77.04, 77.07, 75, 51, 77.11, 77.01, 360/77.02, 77.03, 77.05, 77.06, 78.04, 69, 360/55
See application file for complete search history.

(56) References Cited

U.S. PATENT DOCUMENTS

| | | | |
|---|---|---|---|
| 4,404,605 A | 9/1983 | Sakamoto | |
| 4,764,914 A | 8/1988 | Estes et al. | |
| 5,416,759 A | 5/1995 | Chun | |
| 5,612,833 A | 3/1997 | Yarmchuk et al. | |
| 5,668,679 A | 9/1997 | Swearingen et al. | |
| 5,793,559 A | 8/1998 | Shepherd et al. | |
| 5,844,742 A | 12/1998 | Yarmchuk et al. | |
| 5,889,631 A | 3/1999 | Hobson | |
| 5,907,447 A | 5/1999 | Yarmchuk et al. | |
| 5,930,068 A | 7/1999 | Gregg et al. | |
| 6,061,200 A | 5/2000 | Shepherd et al. | |
| 6,118,739 A | 9/2000 | Kishinami et al. | |
| 6,128,153 A | 10/2000 | Hasegawa et al. | |
| 6,141,175 A | 10/2000 | Nazarian et al. | |
| 6,181,652 B1 | 1/2001 | Katou et al. | |
| 6,370,094 B1 | 4/2002 | Kishinami et al. | |
| 6,392,834 B1 | 5/2002 | Ellis | |
| 6,421,198 B1 | 7/2002 | Lamberts et al. | |
| 6,442,112 B1 | 8/2002 | Tateishi | |
| 6,476,995 B1 | 11/2002 | Liu et al. | |
| 6,496,322 B1 | 12/2002 | Hasegawa et al. | |
| 6,510,112 B1 | 1/2003 | Sakamoto et al. | |
| 6,522,493 B1 | 2/2003 | Dobbek et al. | |
| 6,563,663 B1 | 5/2003 | Bi et al. | |
| 6,606,214 B1 | 8/2003 | Liu et al. | |
| 6,608,731 B2 | 8/2003 | Szita | |
| 6,611,397 B1 | 8/2003 | Nguyen | |
| 6,624,963 B2 | 9/2003 | Szita | |
| 6,654,198 B2 | 11/2003 | Liu et al. | |
| 6,657,810 B1 | 12/2003 | Kupferman | |
| 6,667,840 B1 | 12/2003 | Cheong et al. | |
| 6,735,040 B2 | 5/2004 | Galloway et al. | |
| 6,751,042 B2 | 6/2004 | Bi et al. | |
| 6,775,091 B1 | 8/2004 | Sutardja | |
| 6,785,084 B2 | 8/2004 | Szita | |

(Continued)

*Primary Examiner* — Ali Neyzari

(57) ABSTRACT

A disk drive is disclosed comprising a head actuated over a disk comprising a plurality of spiral tracks, each spiral track comprising a high frequency signal interrupted at a predetermined interval by a sync mark. The head is used to read the spiral tracks to generate a read signal representing spiral track crossings. A position error signal (PES) is generated in response to the spiral track crossings, and the head is servoed over the disk in response to the PES. Timing feed-forward compensation values are generated in response to the PES, and the timing feed-forward compensation values are used to open a demodulation window at each spiral track crossing, wherein the timing feed-forward compensation values compensate for a repeatable runout (RRO) of the spiral tracks.

26 Claims, 13 Drawing Sheets

(56) References Cited

U.S. PATENT DOCUMENTS

| | | | | |
|---|---|---|---|---|
| 6,798,606 | B2 | 9/2004 | Tang et al. | |
| 6,862,155 | B2 | 3/2005 | Yang et al. | |
| 6,922,304 | B2 | 7/2005 | Nakagawa | |
| 6,937,420 | B1 | 8/2005 | McNab et al. | |
| 6,952,320 | B1 | 10/2005 | Pollock et al. | |
| 6,965,491 | B1 | 11/2005 | Perlmutter et al. | |
| 6,972,540 | B1 | 12/2005 | Wang et al. | |
| 6,972,922 | B1 | 12/2005 | Subrahmanyam et al. | |
| 6,975,478 | B2 | 12/2005 | Fukushima et al. | |
| 6,977,792 | B1 | 12/2005 | Melrose et al. | |
| 6,995,941 | B1 | 2/2006 | Miyamura et al. | |
| 6,999,266 | B1 | 2/2006 | Schmidt | |
| 7,002,767 | B2 | 2/2006 | Annampedu et al. | |
| 7,012,778 | B2 | 3/2006 | Shigematsu | |
| 7,027,255 | B2 | 4/2006 | Schmidt | |
| 7,054,096 | B1 | 5/2006 | Sun et al. | |
| 7,057,836 | B1 | 6/2006 | Kupferman | |
| 7,068,451 | B1 | 6/2006 | Wang et al. | |
| 7,106,542 | B1 | 9/2006 | Sun et al. | |
| 7,106,547 | B1 | 9/2006 | Hargarten et al. | |
| 7,110,209 | B2 | 9/2006 | Ehrlich et al. | |
| 7,119,981 | B2 | 10/2006 | Hanson et al. | |
| 7,123,433 | B1 | 10/2006 | Melrose et al. | |
| 7,167,336 | B1 | 1/2007 | Ehrlich et al. | |
| 7,230,786 | B1 * | 6/2007 | Ray et al. | 360/75 |
| 7,257,062 | B2 | 8/2007 | Li et al. | |
| 7,271,977 | B1 | 9/2007 | Melrose et al. | |
| 7,286,317 | B1 | 10/2007 | Li et al. | |
| 7,315,431 | B1 | 1/2008 | Perlmutter et al. | |
| 7,317,669 | B2 | 1/2008 | Lee | |
| 7,330,322 | B2 | 2/2008 | Hanson et al. | |
| 7,333,280 | B1 * | 2/2008 | Lifchits et al. | 360/51 |
| 7,333,287 | B2 | 2/2008 | Hara | |
| 7,333,288 | B2 | 2/2008 | Kim et al. | |
| 7,391,584 | B1 | 6/2008 | Sheh et al. | |
| 7,408,735 | B1 | 8/2008 | Coric | |
| 7,436,742 | B2 | 10/2008 | Yanagawa | |
| 7,457,075 | B2 | 11/2008 | Liu et al. | |
| 7,460,328 | B2 | 12/2008 | Chase et al. | |
| 7,460,330 | B2 * | 12/2008 | Takaishi | 360/78.04 |
| 7,474,491 | B2 | 1/2009 | Liikanen et al. | |
| 7,477,473 | B2 | 1/2009 | Patapoutian et al. | |
| 7,489,469 | B2 | 2/2009 | Sun et al. | |
| 7,525,754 | B2 | 4/2009 | Melrose et al. | |
| 7,551,387 | B2 | 6/2009 | Sun et al. | |
| 7,561,361 | B1 | 7/2009 | Rutherford | |
| 7,639,447 | B1 | 12/2009 | Yu et al. | |
| 7,646,559 | B1 | 1/2010 | Cheung et al. | |
| 7,656,604 | B1 | 2/2010 | Liang et al. | |
| 7,663,835 | B1 | 2/2010 | Yu et al. | |
| 7,715,138 | B1 | 5/2010 | Kupferman | |
| 7,760,455 | B2 | 7/2010 | Kang et al. | |
| 7,773,328 | B1 | 8/2010 | Katchmart et al. | |
| 7,791,832 | B1 | 9/2010 | Cheung et al. | |
| 7,796,479 | B2 | 9/2010 | Kim et al. | |
| 7,800,859 | B2 | 9/2010 | Moriya et al. | |
| 7,839,591 | B1 * | 11/2010 | Weerasooriya et al. | 360/51 |
| 7,876,523 | B1 * | 1/2011 | Panyavoravaj et al. | 360/51 |
| 7,881,005 | B1 | 2/2011 | Cheung et al. | |
| 7,924,519 | B2 | 4/2011 | Lambert | |
| 8,059,360 | B1 * | 11/2011 | Melkote et al. | 360/77.04 |
| 8,077,428 | B1 * | 12/2011 | Chen et al. | 360/75 |
| 8,116,025 | B1 | 2/2012 | Chan et al. | |
| 8,174,941 | B2 | 5/2012 | Takazawa et al. | |
| 8,537,486 | B2 | 9/2013 | Liang et al. | |
| 8,576,506 | B1 * | 11/2013 | Wang et al. | 360/50 |
| 8,605,379 | B1 * | 12/2013 | Sun | 360/51 |
| 2001/0040755 | A1 | 11/2001 | Szita | |
| 2002/0067567 | A1 | 6/2002 | Szita | |
| 2003/0218814 | A9 | 11/2003 | Min et al. | |
| 2005/0152246 | A1 | 7/2005 | Li et al. | |
| 2005/0185319 | A1 | 8/2005 | Liu et al. | |
| 2005/0275964 | A1 | 12/2005 | Hara | |
| 2007/0096678 | A1 | 5/2007 | Melrose | |
| 2007/0097806 | A1 | 5/2007 | Beker et al. | |
| 2007/0297088 | A1 | 12/2007 | Sun et al. | |
| 2008/0186617 | A1 | 8/2008 | Hosono et al. | |
| 2008/0239555 | A1 | 10/2008 | Ehrlich et al. | |
| 2009/0002874 | A1 | 1/2009 | Melrose et al. | |
| 2009/0052081 | A1 | 2/2009 | Chase et al. | |
| 2009/0086364 | A1 | 4/2009 | Gerasimov | |
| 2010/0020428 | A1 | 1/2010 | Mochizuki et al. | |
| 2010/0195235 | A1 | 8/2010 | Vikramaditya et al. | |
| 2010/0214686 | A1 | 8/2010 | Higa et al. | |
| 2012/0033317 | A1 | 2/2012 | Szita | |
| 2012/0275050 | A1 | 11/2012 | Wilson et al. | |
| 2013/0038959 | A1 * | 2/2013 | Liang et al. | 360/31 |

* cited by examiner

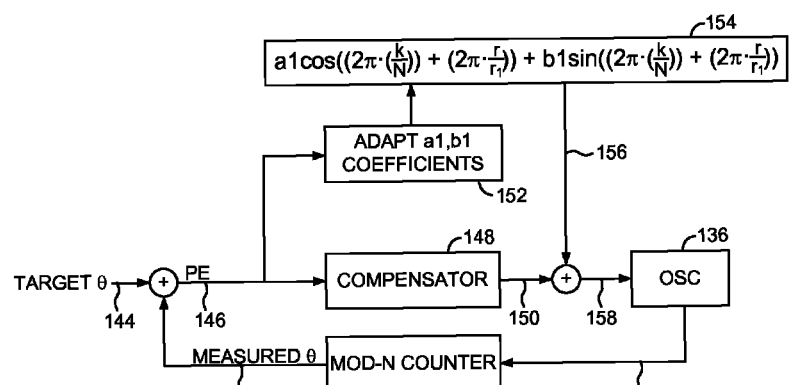
FIG. 13
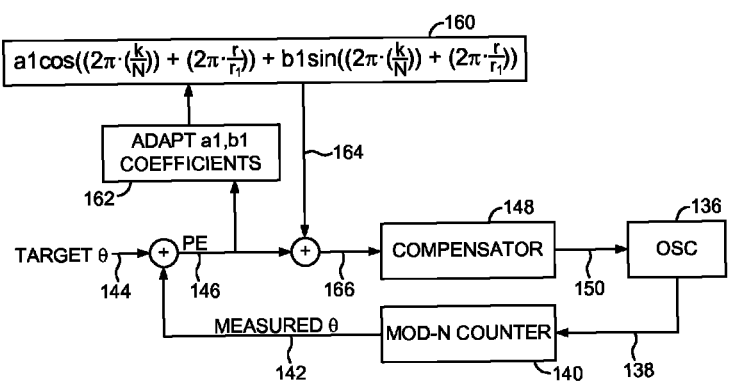
FIG. 14A
FIG. 14B

US 8,724,253 B1

DISK DRIVE ADJUSTING DEMODULATION WINDOW FOR SPIRAL TRACK USING TIMING FEED-FORWARD COMPENSATION

BACKGROUND

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks.

The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

BRIEF DESCRIPTION OF THE DRAWINGS

FIG. 13 shows an equation for computing the offset $r_0$.

FIGS. 14A and 14B show a timing control loop according to an embodiment of the present invention wherein coefficients of a sinusoid are adapted to learn the RRO of the phase error.

DETAILED DESCRIPTION

In an embodiment of the present invention, a disk drive comprises a head actuated over a disk comprising a plurality of spiral tracks, each spiral track comprising a high frequency signal interrupted at a predetermined interval by a sync mark. The head is used to read the spiral tracks to generate a read signal representing spiral track crossings. A position error signal (PES) is generated in response to the spiral track crossings, and the head is servoed over the disk in response to the PES. Timing feed-forward compensation values are generated in response to the PES, and the timing feed-forward compensation values are used to open a demodulation window at each spiral track crossing, wherein the timing feed-forward compensation values compensate for a repeatable runout (RRO) of the spiral tracks.

The spiral tracks may comprise any suitable pattern and may be written to the disk using any suitable technique, such as using a media writer or an external writer for writing the spiral tracks to the disk, or stamping the spiral tracks on the disk using magnetic printing techniques. In another embodiment, the control circuitry internal to each production disk drive may be used to self-servo write the spiral tracks to the disk.

Figure 2B:
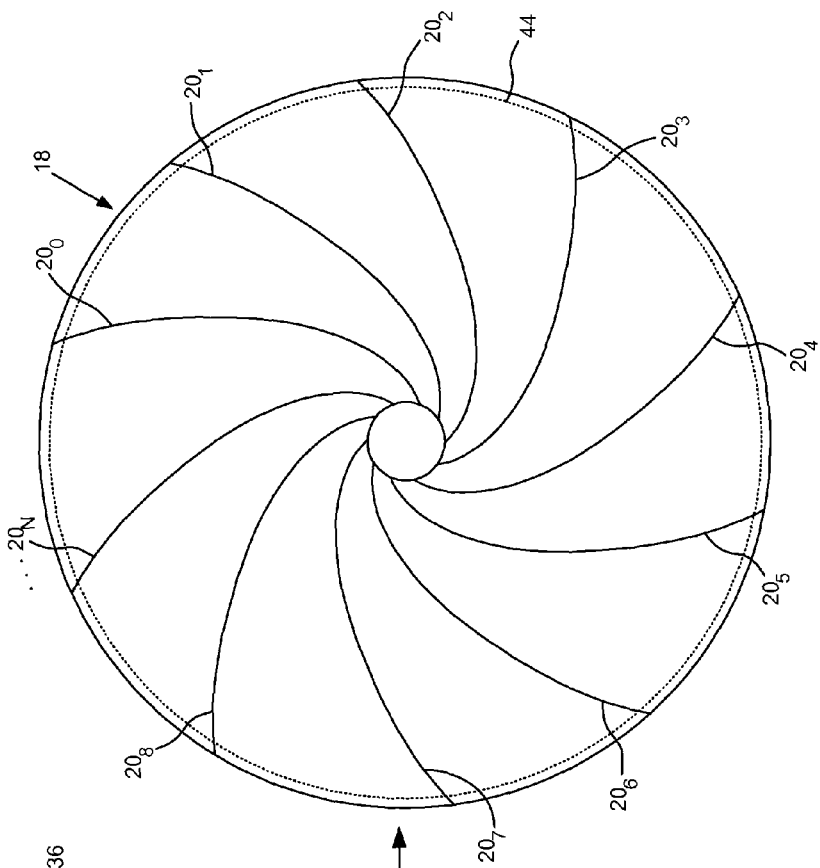
FIGS. 2A and 2B illustrate an embodiment of the present invention wherein an external spiral servo writer is used to write a plurality of spiral tracks to the disk for use in writing product servo sectors to the disk.
Figure 2A:
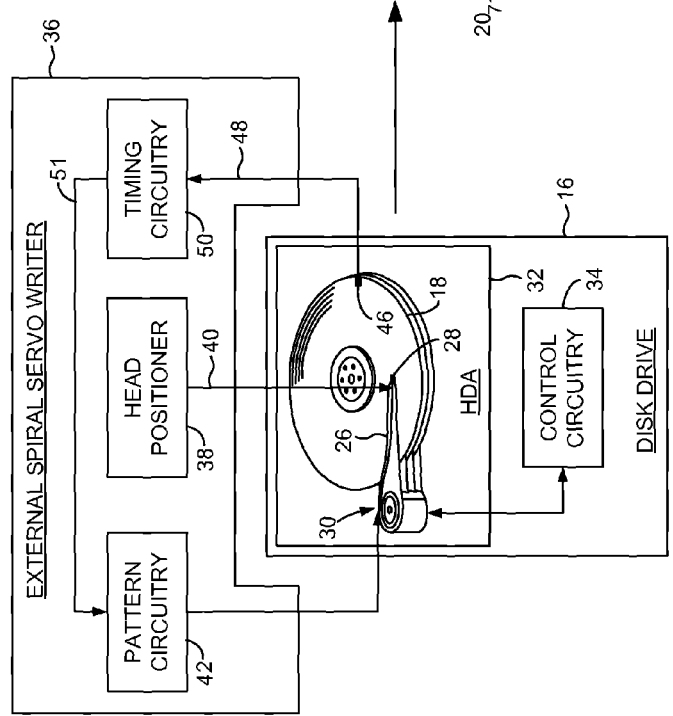

FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track 20i comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables a servo write clock to maintain synchronization while writing the product servo sectors to the disk.

Figure 3:
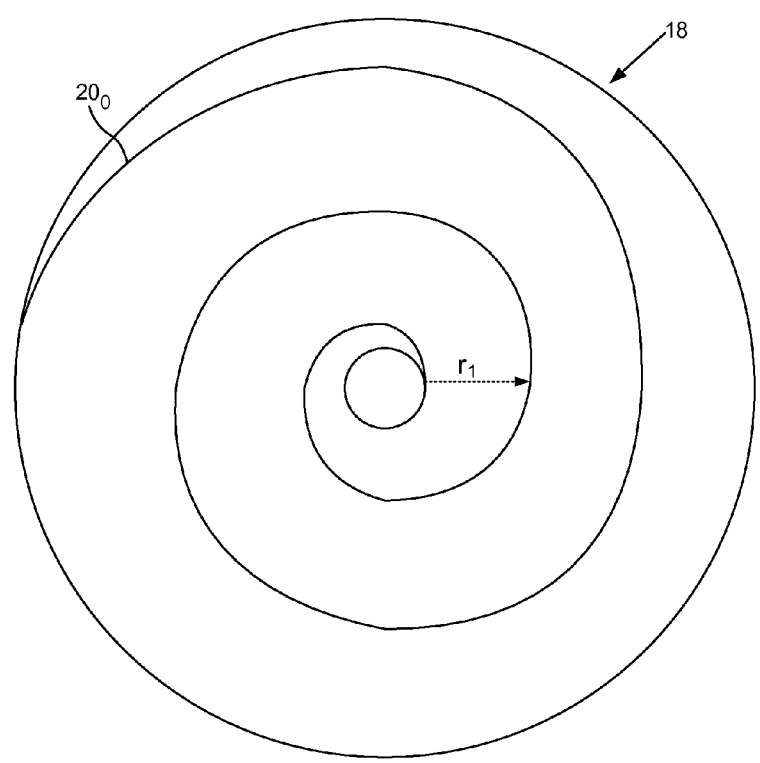
FIG. 3 illustrates an embodiment of the present invention wherein each spiral track is written over multiple revolutions of the disk.

In the embodiment of FIG. 2B, each spiral track 20i is written over a partial revolution of the disk 18. In an alternative embodiment, each spiral track 20i is written over one or more revolutions of the disk 18. FIG. 3 shows an embodiment wherein each spiral track 20i is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment, an external product servo writer may be used to process the spiral tracks $20_0$-$20_N$ in order to write the product servo sectors to the disk 18 during a "fill operation".

Figure 4:
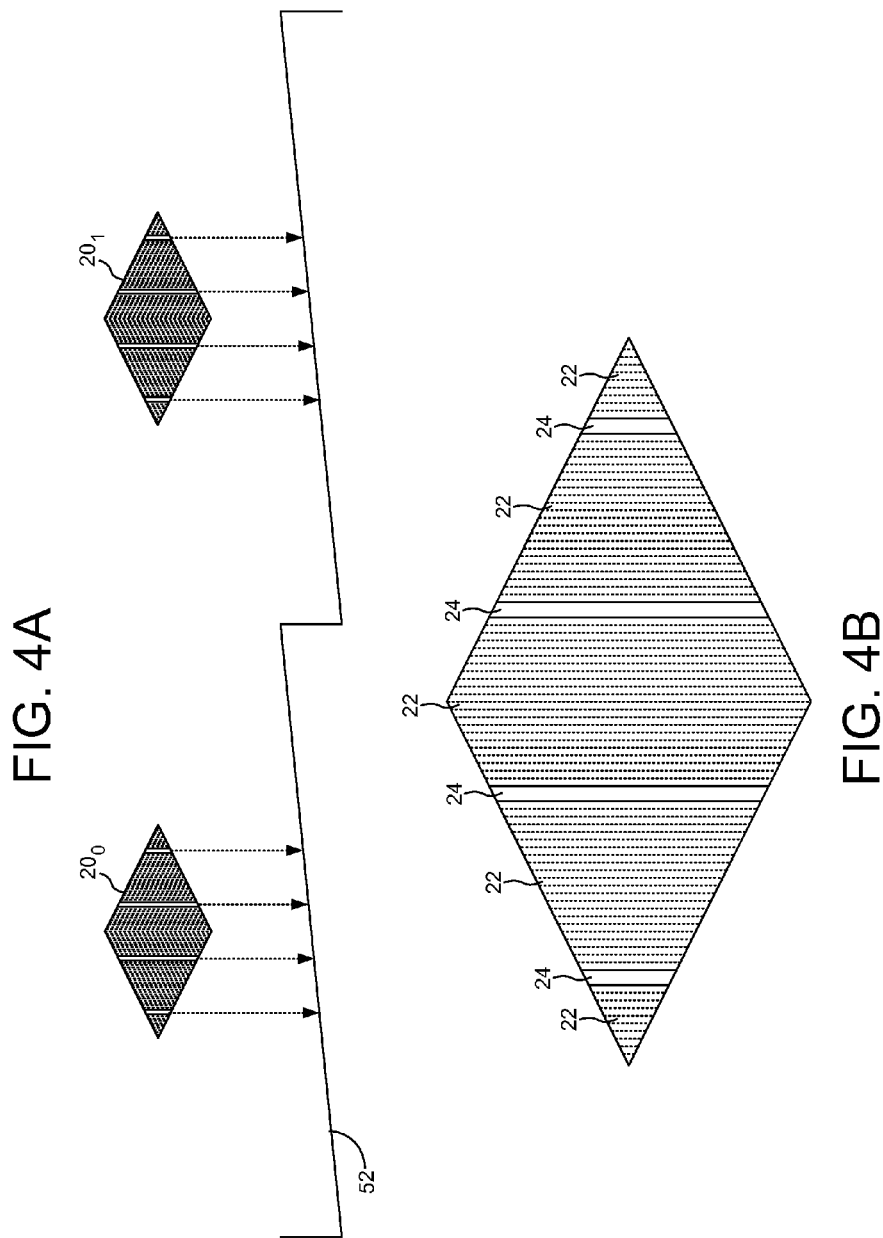
FIG. 4A shows an embodiment of the present invention wherein a servo write clock is synchronized by clocking a modulo-N counter relative to when the sync marks in the spiral tracks are detected.
FIG. 4B shows an eye pattern generated by reading the spiral track, including the sync marks in the spiral track.

FIG. 4B illustrates an "eye" pattern in the read signal that is generated when the head 28 crosses over a spiral track 20. The read signal representing the spiral track crossing comprises high frequency transitions 22 interrupted by sync marks 24 at a predetermined interval. When the head 28 moves in the radial direction, the eye pattern will shift (left or right) while the sync marks 24 remain fixed (ideally). The shift in the eye pattern (detected from the high frequency signal 22) relative to the sync marks 24 provides the off-track information (spiral position error signal (PES)) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

Figure 1:
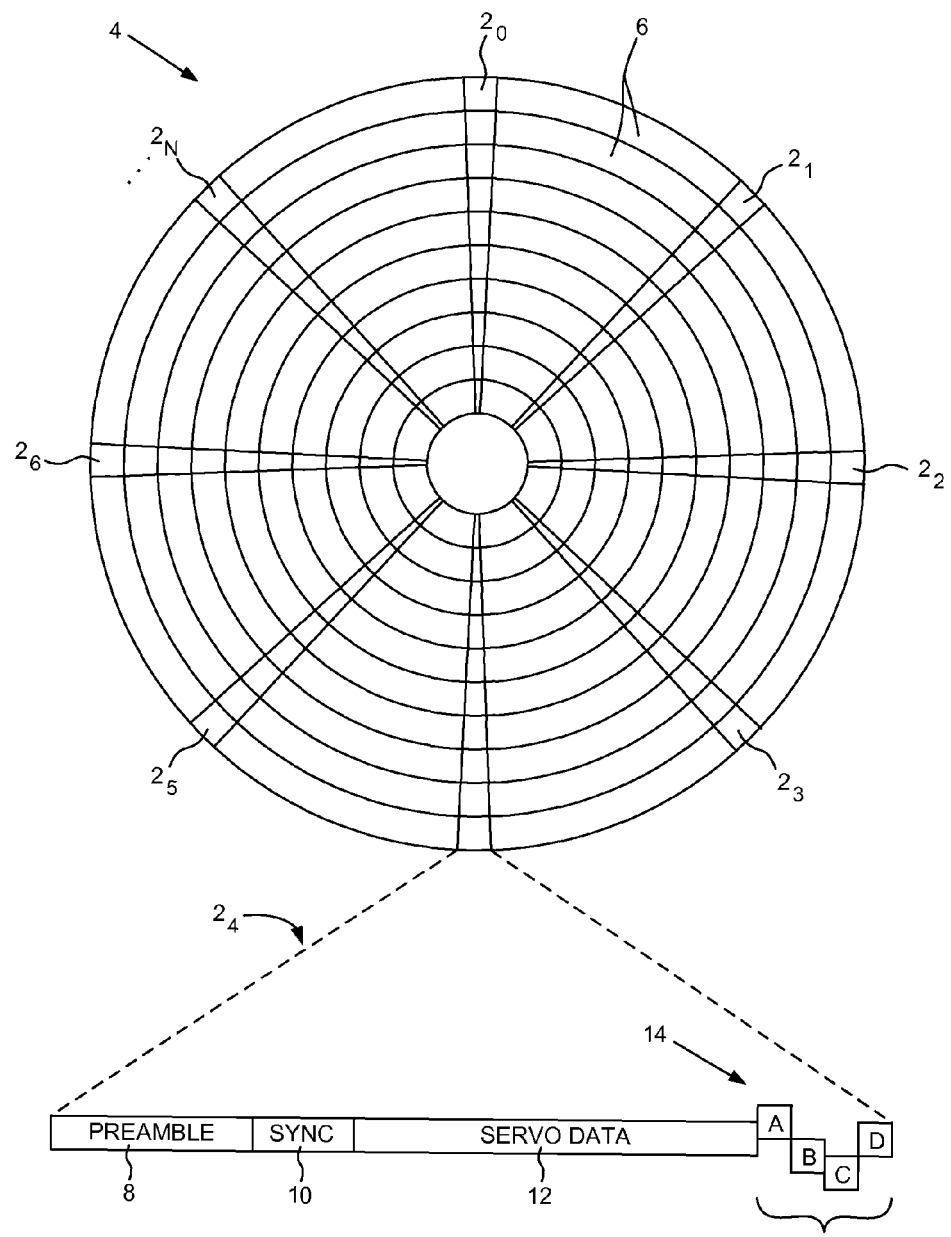
FIG. 1 shows a prior art disk format comprising a plurality of radially spaced, concentric tracks defined by a plurality of product servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
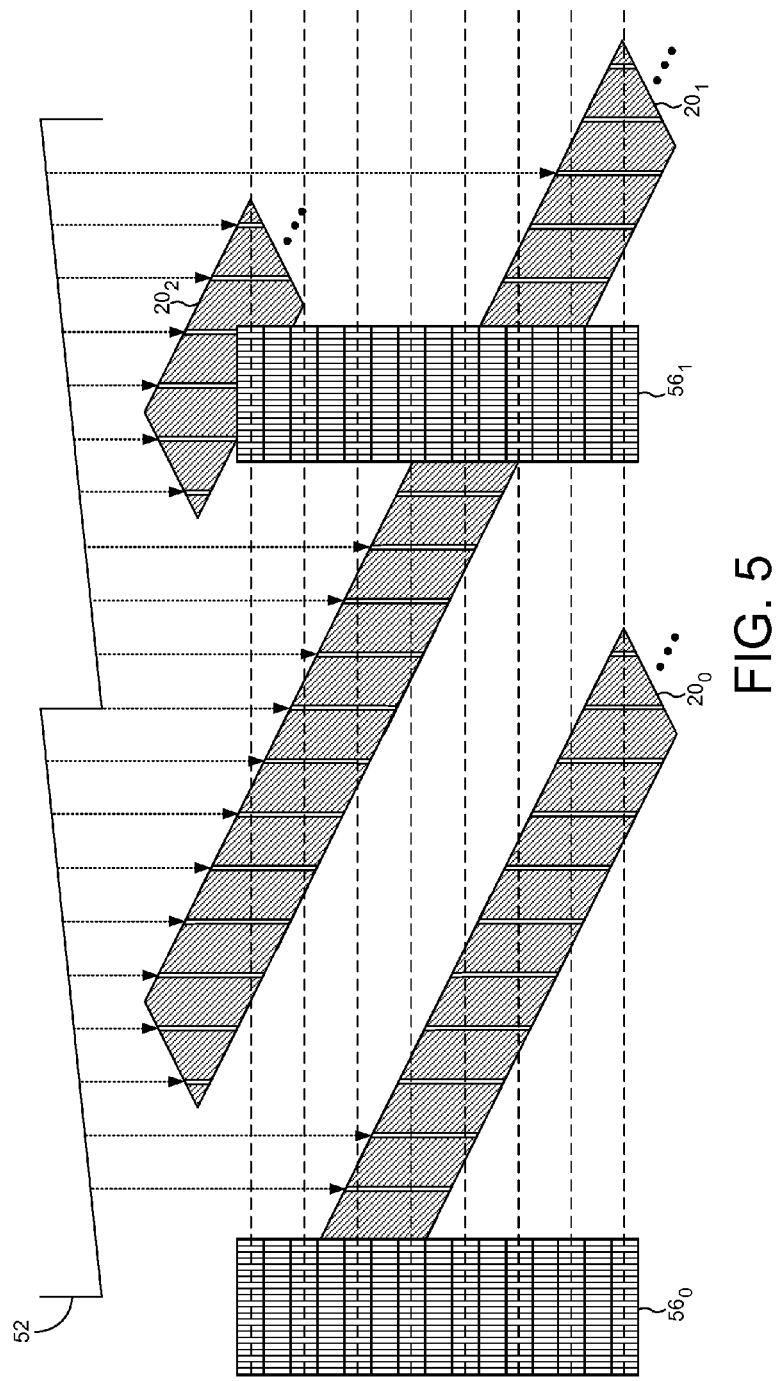
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to at least the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The spiral PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_0$ is processed initially to generate the spiral PES tracking error and the servo write clock timing recovery measurement. When the product servo sectors $56_1$ begin to overwrite spiral track $20_1$, spiral track $20_0$ is processed to generate the spiral PES tracking error and the servo write clock timing recovery measurement.

In the embodiments of the present invention, a demodulation window 54 (FIG. 6A) is opened as the head approaches each spiral track. This helps ensure the resulting read signal represents the spiral track crossing and reduces the amount of noise in the read signal due to other aberrations on the disk (including previously written product servo sectors). As the head is moved radially over the disk, the demodulation window 54 is adjusted based on the expected location of an ideal spiral track as illustrated in FIG. 6A.

In the embodiment of FIG. 2B, the spiral tracks $20_0$-$20_N$ are concentric with relative to a rotation axis of the disk, and therefore the spiral tracks define concentric servo tracks relative to the rotation axis of the disk. In reality the spiral tracks $20_0$-$20_N$ may be eccentric relative to the rotation axis of the disk due to a misalignment in clamping the disk to a spindle motor after writing the spiral tracks $20_0$-$20_N$ to the disk, or due to servo errors when self-writing the spiral tracks $20_0$-$20_N$ to the disk. The resulting eccentric spiral tracks will be non-linear as shown in FIG. 6B as compared to the ideal spiral track shown in FIG. 6A. The eccentricity in the spiral tracks will induce an error in the demodulation window 54 as illustrated in FIG. 6B such that part or all of a spiral track crossing may occur outside of the demodulation window 54.

Figure 7A:
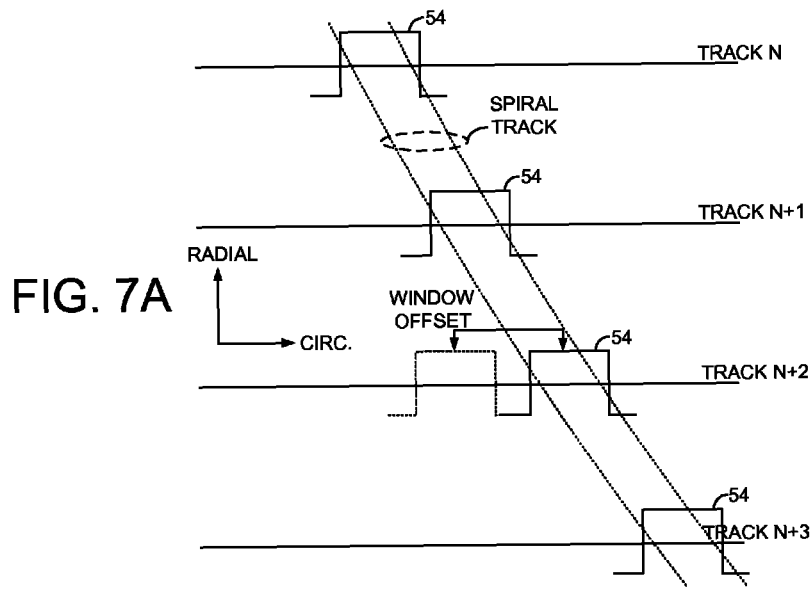
FIG. 7A illustrates an embodiment of the present invention wherein the demodulation window is adjusted in a manner that tracks the repeatable runout in the actual spiral track crossing.

FIG. 7A illustrates an embodiment of the present invention wherein the demodulation window 54 is adjusted in order to track the repeatable runout (RRO) in the actual spiral track crossing. In an embodiment shown in FIG. 7B, a window timing control loop is used to adjust the demodulation window 54 for a particular spiral track, including to compensate for RRO. In one embodiment, there are N window timing control loops each corresponding to a respective spiral track. In this manner, each of the N window timing control loops may track the RRO of the spiral tracks in general, as well as the unique imperfections of each spiral track.

Figure 6A:
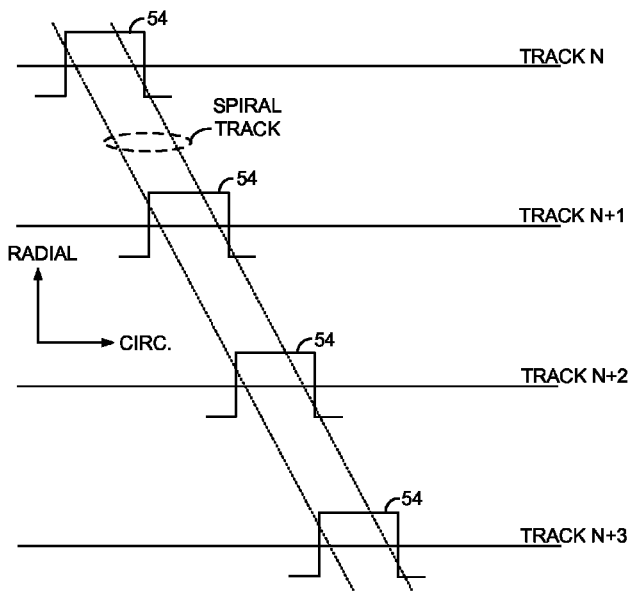
FIG. 6A illustrates a technique for adjusting a demodulation window in order to follow the trajectory of an ideal spiral track crossing as the head moves radially over the disk.
Figure 6B:
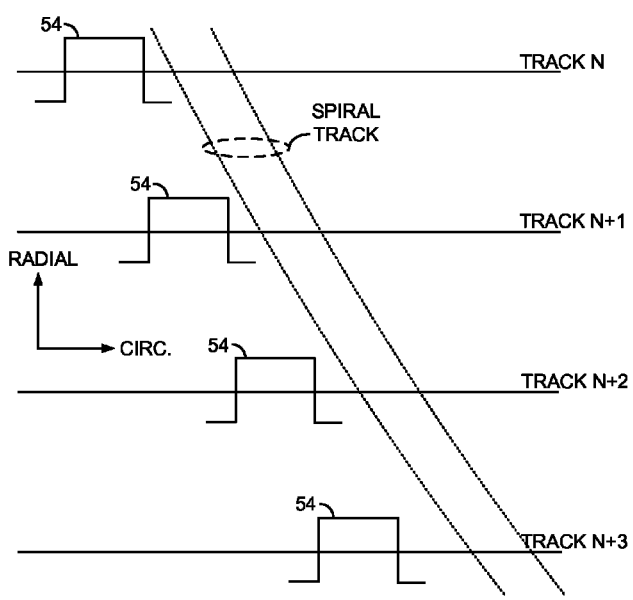
FIG. 6B illustrates how repeatable runout (RRO) in an actual spiral track crossing may induce error in the demodulation window.
Figure 7B:
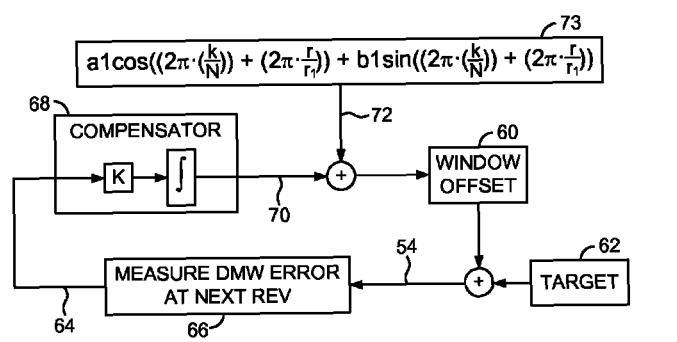
FIG. 7B illustrates an embodiment of the present invention wherein a window timing control loop adjusts the demodulation window using timing feed-forward compensation values.

In the embodiment of FIG. 7B, a window offset 60 adjusts a target window location 62 to generate the demodulation window 54 (as illustrated in FIG. 7A), wherein in one embodiment the target window location 62 corresponds to the location of an ideal spiral track (FIG. 6A). The adjusted demodulation window 54 is then opened during a next disk revolution and a window phase error 64 is generated 66 representing a framing error relative to the spiral track crossing.

A servo compensator 68 filters the window phase error 64 to generate a control signal 70 for adjusting the window offset 60 in a direction that reduces the window phase error 64. This process is repeated for each revolution of the disk, and in one embodiment, the process is repeated while seeking the head radially over the disk. In this manner, the demodulation window 54 tracks the imperfections in the spiral track which can vary over the radius of the disk as illustrated in FIG. 7A.

In order to compensate for the RRO of a spiral track, timing feed-forward compensation values 72 are added to the control signal 70 so that the demodulation window 54 essentially follows the RRO. In the embodiment of FIG. 7B, the timing feed-forward compensation values are generated by generating first coefficients (a1,b1) of a first sinusoid 73 that estimates the RRO of the spiral track:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where a1 and b1 are the first coefficients, k is the kth spiral track out of N spiral tracks, r is the radial location of the head, and $r_1$ represents a part of the radius of the disk spanned by a complete revolution of the spiral tracks (as illustrated in FIG. 3).

Figure 8A:
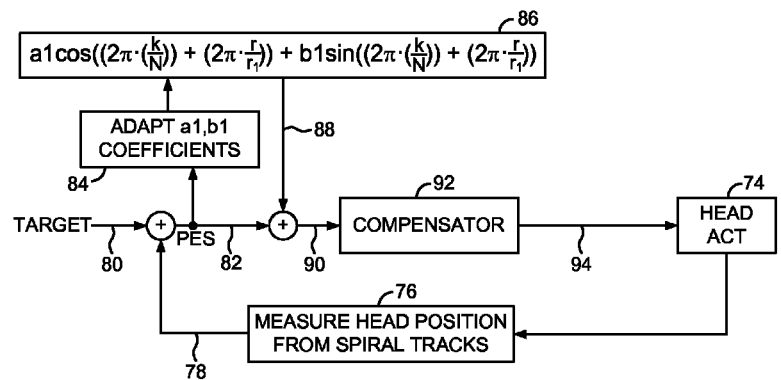
FIG. 8A illustrates an embodiment of the present invention wherein a position control loop positions the head over the disk in response to the spiral tracks, and coefficients of a sinusoid are adjusted so as to cancel a repeatable runout (RRO) from a position error signal (PES).

The timing feed-forward compensation values 72 may be generated in any suitable manner, and in one embodiment in response to the PES generated by a position control system. FIG. 8A shows a position control loop according to an embodiment of the present invention which is described with reference to the flow diagram of FIG. 9. An actuator 74 (e.g., a voice coil motor) actuates the head over the disk and a position of the head is measured in response to the spiral tracks 76 to generate a position signal 78 (block 96). The position signal 78 is subtracted from a target position 80 to generate a position error signal (PES) 82 (block 98). Coefficients (a1,b1) of a sinusoid are adapted 84 in response to the PES 82 in order to generate a sinusoid 86 representing the RRO in the PES 82 (block 102). In the embodiment of FIG. 8A, the sinusoid 86 generates position compensation values 88 representing the RRO that are subtracted from the PES 82 to generate a modified PES 90. The modified PES 90 is processed by a suitable compensator 92 to generate a control signal 94 applied to the actuator 74 in order to servo the head over the disk (block 100). The coefficients (a1,b1) of the sinusoid 86 are adapted 84 over time using a suitable learning algorithm so as to minimize the RRO in the modified PES 90.

After adapting 84 the coefficients (a1,b1) in FIG. 8A, the sinusoid 86 represents the RRO in the PES 82. In one embodiment, the RRO in the PES 82 comprises essentially the same phase and normalized amplitude as the RRO in the spiral tracks. Accordingly, in one embodiment the sinusoid 73 used to generate the timing feed-forward compensation values 72 in FIG. 7B is essentially the same sinusoid 86 used to generate the position feed-forward compensation values 88 in the position control loop of FIG. 8A (block 102). In one embodiment, the coefficients (a1,b1) of the position control loop sinusoid 86 of FIG. 8A may be suitably scaled to generate the coefficients (a1,b1) of the window timing control loop sinusoid 73 of FIG. 7B (i.e., in order to suitably scale the amplitude of the sinusoid 73). The timing feed-forward compensation values 72 generated from the sinusoid 73 are then used to open the demodulation window at the appropriate time as described above (block 104).

In one embodiment, the position control loop may be implemented to follow at least part of the RRO in the PES 82.

Figure 8B:
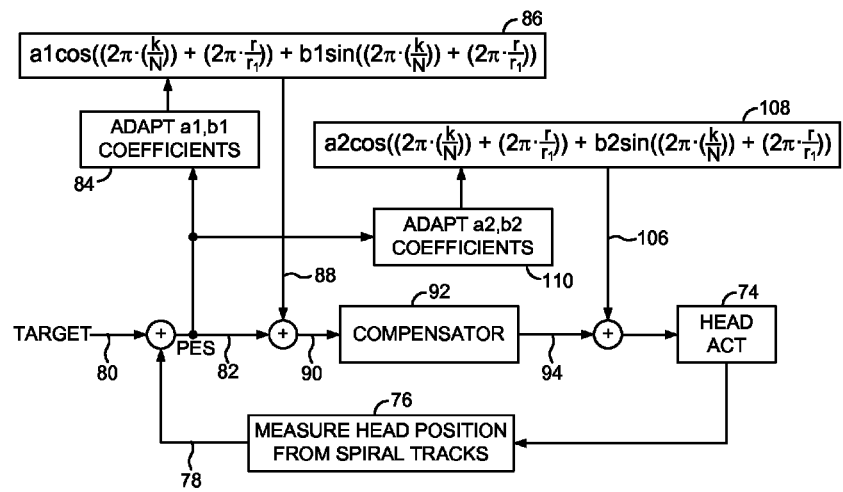
FIG. 8B illustrates an embodiment of the present invention wherein a first sinusoid is adjusted to cancel at least part of the RRO from the PES and a second sinusoid is adjusted to follow the remaining RRO in the PES.

This is understood with reference to FIG. 8B which shows a position control loop similar to FIG. 8A with the addition of position feed-forward compensation values 106 generated by a second sinusoid 108. The position feed-forward compensation values 106 are added to the control signal 94 in order to force the head to follow at least part of the RRO in the PES 82. In one embodiment, the adapting 84 of the first coefficients (a1,b1) of the first sinusoid 86 is disabled while adapting 110 the second coefficients (a2,b2) of the second sinusoid 108. If after fully adapting 110 the second coefficients (a2,b2) so that the head substantially follows the RRO in the PES 82, there is no need for the timing feed-forward compensation values 72 (the first coefficients (a1,b1) are zero).

In one embodiment, it may be desirable to define at least partially concentric servo tracks while servo writing using eccentric spiral tracks. That is, it may be desirable to cancel at least part of the RRO in the PES 82 while servoing on eccentric spiral tracks so that when writing the product servo sectors to the disk the resulting servo tracks are at least partially concentric relative to the rotation axis of the disk. In one embodiment, the position control loop is initialized to follow the RRO in the PES 82 as described above, and then the second coefficients (a2,b2) of the second sinusoid 108 are reduced incrementally while allowing the first coefficients (a1,b1) to adapt to the increasing RRO in the PES 82 after each incremental adjustment.

Figure 10:
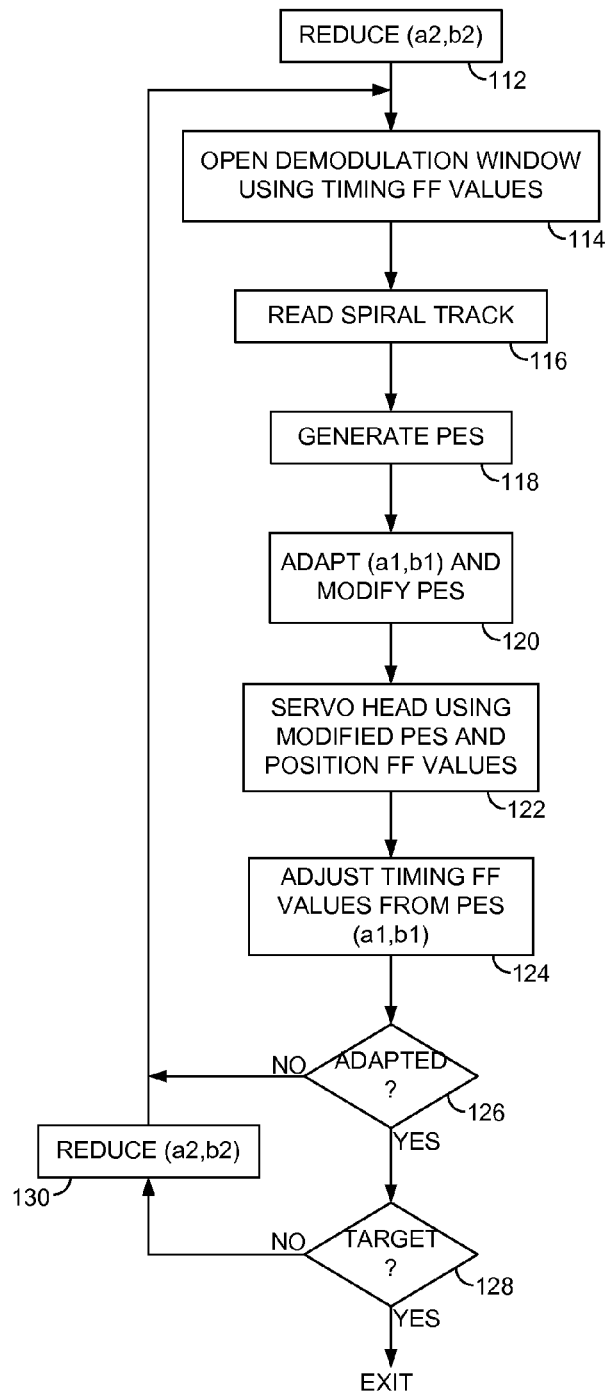
FIG. 10 is a flow diagram according to an embodiment of the present invention wherein the amount of RRO in the PES followed by the position control system is incrementally reduced, and the sinusoid for cancelling the RRO is allowed to adapt after each incremental reduction.

This embodiment is understood with reference to the flow diagram of FIG. 10, wherein after initially adapting the second coefficients (a2,b2) so that the head substantially follows the RRO in the PES as described above, the second coefficients (a2,b2) are reduced incrementally (block 112). The timing control loop of FIG. 7B opens the demodulation window at each spiral track crossing using the timing feed-forward compensation values which are initially zero (block 114). The spiral track is read (block 116), and the PES generated (block 118). The first coefficients (a1,b1) are adapted 84 in response to the increased RRO in the PES, and the PES is modified in response to the position compensation values 88 in order to cancel the increased RRO from the PES (block 120). The head is servoed over the disk in response to the modified PES and the position feed-forward compensation values 106 (block 122). The timing feed-forward compensation values 72 are adjusted in response to the adapted coefficients (a1,b1) (block 124).

The flow diagram is repeated from block 114 until the first coefficients (a1,b1) adapt sufficiently, that is, until the RRO in the PES is substantially canceled. Allowing the first coefficients (a1,b1) to adapt enables the timing control loop of FIG. 7B to adapt to the transient caused by reducing the second coefficients (a2,b2). After the first coefficients (a1,b1) adapt sufficiently (block 126), the second coefficients (a2,b2) are again reduced incrementally (block 130) and the flow diagram repeated starting from block 114. This process is repeated until a target amount of RRO has been canceled from the PES (block 128), thereby defining at least partially concentric servo tracks when writing the product servo sectors to the disk. In one embodiment, the second coefficients (a2,b2) are reduced incrementally to zero so that the servo tracks are substantially concentric relative to a rotation axis of the disk. In one embodiment, the degree to which the second coefficients (a2,b2) are incrementally reduced in the flow diagram of FIG. 10 is selected so that the window timing control loop of FIG. 7B and the position control loop of FIG. 8B maintain stability and eventually adapt to the transient after each incremental reduction (i.e., after each incremental RRO increase in the PES).

Figure 12A:
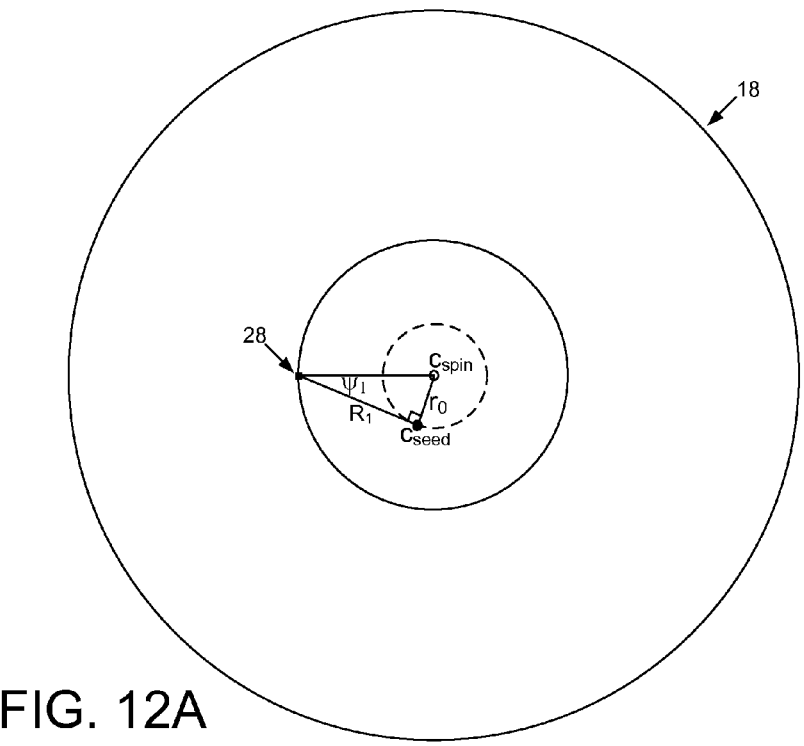
FIGS. 12A and 12B illustrate an embodiment of the present invention wherein repeatable runout (RRO) of a phase error at two radial locations is used to estimate the offset $r_0$.

The axis of rotation of the spiral tracks $20_0$-$20_N$ recorded on the disk 18 may be offset from an axis of rotation of the disk 18. This is illustrated in FIG. 12A which shows an offset $r_0$ between Cspin (axis of disk) and Cseed (axis of spiral tracks $20_0$-$20_N$), wherein Cseed will rotate in a circle around Cspin (illustrated by a dashed line) as the disk 18 rotates. In one embodiment, the offset $r_0$ may be caused by an offset when clamping the disk 18 to a spindle motor after recording the spiral tracks $20_0$-$20_N$ on the disk 18. In another embodiment, the control circuitry 34 within the disk drive may write the spiral tracks $20_0$-$20_N$ on the disk 18, wherein the offset $r_0$ may be caused by errors in the writing process (written-in error).

Figure 9:
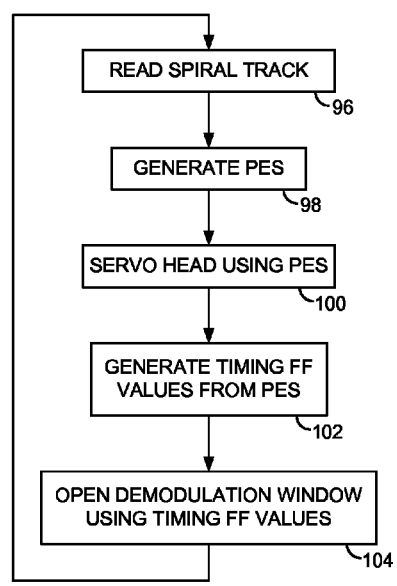
FIG. 9 is a flow diagram according to an embodiment of the present invention wherein the timing feed-forward compensation values are generated in response to the PES, for example, by adjusting coefficients of a sinusoid.
Figure 11:
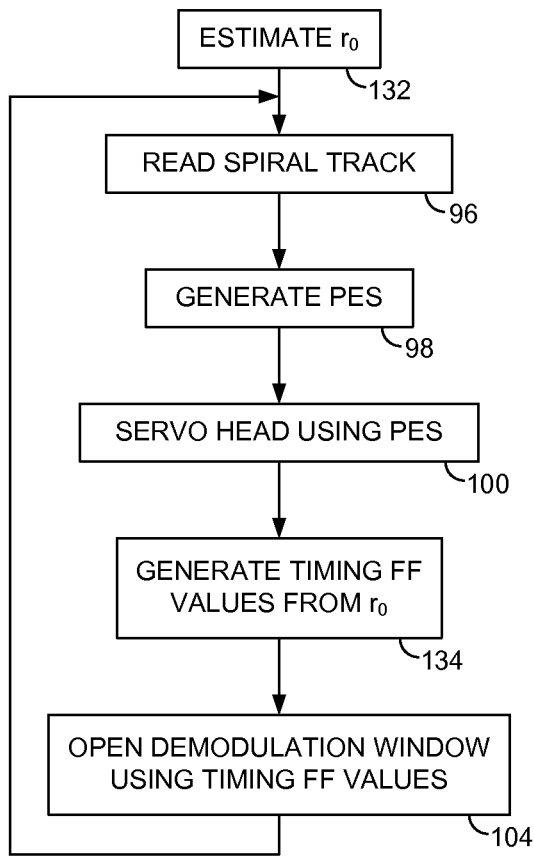
FIG. 11 is a flow diagram according to an embodiment of the present invention wherein the timing feed-forward compensation values are generated in response to an estimated offset $r_0$ representing a difference between an axial rotation of the disk and an axial rotation of the spiral tracks.

FIG. 11 is a flow diagram according to an embodiment of the present invention which is a modification to the flow diagram of FIG. 9 described above. Instead of generating the timing feed-forward compensation values from the PES, the offset $r_0$ is estimated (block 132) representing a difference between an axial rotation of the disk and an axial rotation of the spiral tracks (as shown in FIG. 12A). The timing feed-forward compensation values are then generated in response to the estimated offset $r_0$ (block 134) For example, in one embodiment the estimated offset $r_0$ (amplitude and phase) may be used to generate the coefficients a1,b1 of the sinusoid 73 shown in FIG. 7B.

The offset $r_0$ may be estimated in any suitable manner. In one embodiment, the coefficients of a sinusoid in the position control loop may be adapted as described above with reference to FIGS. 8A and 8B, and then the offset $r_0$ (amplitude and phase) estimated in response to the coefficients of the sinusoid (e.g., sinusoid 86 in FIG. 8A and/or sinusoid 108 in FIG. 8B). That is, the amplitude and phase of the sinusoid(s) may be transformed to represent the offset $r_0$ in vector form. In an alternative embodiment described below, the offset $r_0$ may be estimated based on the RRO in a phase error of a timing control loop used to generate a servo write clock.

As the disk 18 rotates and Cseed rotates around Cspin as shown in FIG. 12A, a repeatable runout (RRO) is induced in the phase error of the PLL that generates the servo write clock. The instantaneous RRO in the phase error relative to the rotation angle of the disk is represented by the angle $\Psi_1$ in FIG. 12A. In addition, the angle representing the RRO in the phase error will reach a peak when the distance R1 of the head 28 from Cseed forms a right angle with the offset $r_0$. Although the location of the head 28 can be determined relative to the spiral tracks $20_0$-$20_N$, the distance R1 of the head 28 from Cseed is unknown (because $r_0$ is unknown).

Figure 12B:
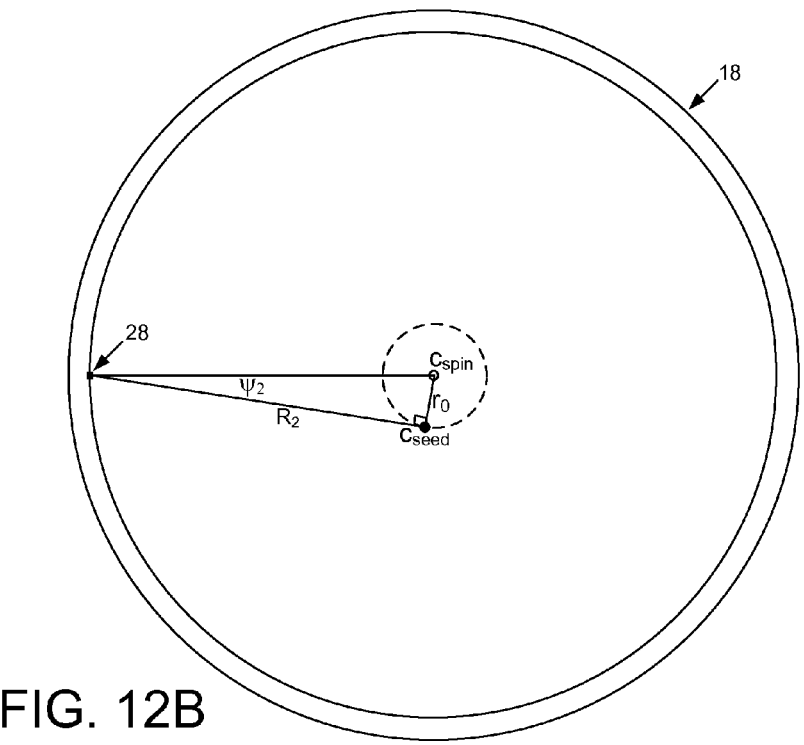

In one embodiment in order to estimate the offset $r_0$, the head 28 is positioned at a first radial location R1 as shown in FIG. 12A and a first peak $\Psi_1$ in a first RRO of the phase error is measured. The head 28 is then positioned at a second radial location R2 as shown in FIG. 12B and a second peak $\Psi_2$ in a second RRO of the phase error is measured. The offset $r_0$ may then be estimated in one embodiment as follows:

$$R2-R1 = r_0/\tan \psi_2 - r_0/\tan \psi_1$$

then $$r_0 = \frac{(R2-R1)}{(1/\tan\psi_2 - 1/\tan\psi_1)} \quad \text{(FIG. 13)}$$

The phase of the offset $r_0$ relative to the rotation angle of the disk 18 may be determined relative to the angle of the disk 18 when the RRO in the phase error reaches its peak. In the example shown in FIGS. 12A and 12B, the rotation angle of the disk 18 is slightly different between the first peak $\Psi_1$ and the second peak $\Psi_2$. In one embodiment, the phase of the offset $r_0$ may be computed as the average of the rotation phase of the disk measured at the first peak $\Psi_1$ and the second peak $\Psi_2$.

Estimating the offset $r_0$ using the above equation assumes the head 28 follows the RRO in the position error while servoing on the spiral tracks $20_0$-$20_N$ (e.g., using feed-forward compensation). In this manner, the distance between R1 and R2 can be measured based on the corresponding tracks defined by the spiral tracks $20_0$-$20_N$ when $\Psi_1$ and $\Psi_2$ reach their peak. In another embodiment, the RRO may be canceled from the position error while servoing on the spiral tracks $20_0$-$20_N$. In this embodiment, R1 and R2 may be measured along the axis aligned with Cspin based on the corresponding tracks defined by the spiral tracks $20_0$-$20_N$ when $\Psi_1$ and $\Psi_2$ reach their peak. Accordingly, the above equation in this embodiment is modified to derive the estimate for the offset $r_0$ based on the measured hypotenuse of the right triangles shown in FIGS. 12A and 12B.

FIG. 14A shows a timing control loop according to an embodiment of the present invention wherein an oscillator 136 generates a servo write clock 138 that clocks a modulo-N counter 140. The output 142 of the modulo-N counter represents a measured phase of the servo write clock 138 which is subtracted from a target phase 144 to generate a phase error 146. The phase error 146 is filtered with a suitable compensator 148 to generate a control signal 150. The phase error 146 comprises a RRO due to the offset $r_0$ between Cspin and Cseed as described above. In this embodiment, the RRO in the phase error 146 may be learned by adapting coefficients a1,b1 (block 152) of a sinusoid 154 that generates feed-forward timing compensation values 156. The sinusoid is generated according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where a1 and b1 are the first coefficients, k is the kth spiral track out of N spiral tracks, r is the radial location of the head, and $r_1$ represents a part of the radius of the disk spanned by a complete revolution of the spiral tracks (as illustrated in FIG. 3).

The feed-forward timing compensation values 156 adjust the control signal 150 to generate an adjusted control signal 158 used to adjust the frequency of the oscillator 136. The coefficients a1,b1 are adapted 152 in order to drive the RRO in the phase error 146 toward zero. Once the coefficients a1,b1 have adapted, the resulting sinusoid 154 represents the RRO in the phase error 146, and the peak in the sinusoid 154 represents the peak in the RRO ($\Psi_1$ or $\Psi_2$ described above).

FIG. 14B shows an alternative embodiment of the present invention wherein coefficients a1,b1 of a sinusoid 160 may be adapted 162 in response to the phase error 146 to generate timing compensation values 164 that are subtracted from the phase error 146 in order to generate an adjusted phase error 166. The coefficients a1,b1 are adapted until the RRO is substantially canceled from the adjusted phase error 166, thereby generating a servo write clock 138 that is synchronized to the rotation of the disk 18 rather than to the rotation of the spiral tracks $20_0$-$20_N$ as in the embodiment of FIG. 14A. Similar to the embodiment of FIG. 14A, after the coefficients a1,b1 have adapted, the resulting sinusoid 160 represents the RRO in the phase error 146, and the peak in the sinusoid 160 represents the peak in the RRO $\Psi_1$ or $\Psi_2$ described above).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of spiral tracks, each spiral track comprising a high frequency signal interrupted at a predetermined interval by a sync mark;
   a head actuated over the disk; and
   control circuitry operable to:
   use the head to read the spiral tracks to generate a read signal representing spiral track crossings;
   generate a position error signal (PES) in response to the spiral track crossings;
   servo the head over the disk in response to the PES;
   generate timing feed-forward compensation values in response to the PES; and
   use the timing feed-forward compensation values to open a demodulation window at each spiral track crossing, wherein the timing feed-forward compensation values compensate for a repeatable runout (RRO) of the spiral tracks.

2. The disk drive as recited in claim 1, wherein the control circuitry is operable to generate the timing feed-forward compensation values by generating first coefficients of a first sinusoid.

3. The disk drive as recited in claim 2, wherein the control circuitry is further operable to generate the timing feed-forward compensation values according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where:
a1 and b1 are the first coefficients;
k is the kth spiral track out of N spiral tracks;
r is the radial location of the head; and
$r_1$ represents a part of the radius of the disk spanned by a complete revolution of the spiral tracks.

4. The disk drive as recited in claim 2, wherein the control circuitry is further operable to adjust the PES based on the first sinusoid in order to cancel at least part of the RRO in the PES.

5. The disk drive as recited in claim 3, wherein the control circuitry is further operable to adjust the PES based on the first sinusoid in order to cancel at least part of the RRO in the PES.

6. The disk drive as recited in claim 5, wherein the control circuitry is further operable to:
generate position feed-forward compensation values in response to the PES by generating second coefficients of a second sinusoid;
servo the head over the disk in response to the adjusted PES and the position feed-forward compensation values to cause the head to follow at least part of the RRO in the PES; and
reduce the second coefficients and adapt the first coefficients to account for a corresponding increase of the RRO in the PES.

7. The disk drive as recited in claim 6, wherein the control circuitry is further operable to:
incrementally reduce the second coefficients until reaching a target amount of RRO in the PES; and
allow the first coefficients to adapt after each incremental reduction of the second coefficients.

8. A disk drive comprising:
a disk comprising a plurality of spiral tracks, each spiral track comprising a high frequency signal interrupted at a predetermined interval by a sync mark;
a head actuated over the disk; and
control circuitry operable to:
use the head to read the spiral tracks to generate a read signal representing spiral track crossings;
generate a position error signal (PES) in response to the spiral track crossings;
adjust the PES based on first coefficients of a first sinusoid in order to cancel at least part of a repeatable runout (RRO) in the PES;
generate position feed-forward compensation values in response to the PES by generating second coefficients of a second sinusoid; and
servo the head over the disk in response to the adjusted PES and the position feed-forward compensation values to cause the head to follow at least part of the RRO in the PES.

9. The disk drive as recited in claim 8, wherein the control circuitry is further operable to generate the first sinusoid according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where:
a1 and b1 are the first coefficients;
k is the kth spiral track out of N spiral tracks;
r is the radial location of the head; and
$r_1$ represents a part of the radius of the disk spanned by a complete revolution of the spiral tracks.

10. The disk drive as recited in claim 8, wherein the control circuitry is further operable to:
generate timing feed-forward compensation values in response to the second coefficients of the second sinusoid; and
use the timing feed-forward compensation values to open a demodulation window at each spiral track crossing, wherein the timing feed-forward compensation values compensate for the RRO in the PES.

11. The disk drive as recited in claim 8, wherein the control circuitry is further operable to reduce the second coefficients and adapt the first coefficients to account for a corresponding increase of the RRO in the PES.

12. The disk drive as recited in claim 11, wherein the control circuitry is further operable to:
incrementally reduce the second coefficients until reaching a target amount of RRO in the PES; and
allow the first coefficients to adapt after each incremental reduction of the second coefficients.

13. A method of operating a disk drive, the disk drive comprising a head actuated over a disk comprising a plurality of spiral tracks, each spiral track comprising a high frequency signal interrupted at a predetermined interval by a sync mark, the method comprising:
using the head to read the spiral tracks to generate a read signal representing spiral track crossings;
generating a position error signal (PES) in response to the spiral track crossings;
servoing the head over the disk in response to the PES;
generating timing feed-forward compensation values in response to the PES; and
using the timing feed-forward compensation values to open a demodulation window at each spiral track crossing, wherein the timing feed-forward compensation values compensate for a repeatable runout (RRO) of the spiral tracks.

14. The method as recited in claim 13, further comprising generating the timing feed-forward compensation values by generating first coefficients of a first sinusoid.

15. The method as recited in claim 14, further comprising generating the timing feed-forward compensation values according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where:
a1 and b1 are the first coefficients;
k is the kth spiral track out of N spiral tracks;
r is the radial location of the head; and
$r_1$ represents a part of the radius of the disk spanned by a complete revolution of the spiral tracks.

16. The method as recited in claim 14, further comprising adjusting the PES based on the first sinusoid in order to cancel at least part of the RRO in the PES.

17. The method as recited in claim 15, further comprising adjusting the PES based on the first sinusoid in order to cancel at least part of the RRO in the PES.

18. The method as recited in claim 17, further comprising:
generating position feed-forward compensation values in response to the PES by generating second coefficients of a second sinusoid;
servoing the head over the disk in response to the adjusted PES and the position feed-forward compensation values to cause the head to follow at least part of the RRO in the PES; and
reducing the second coefficients and adapt the first coefficients to account for a corresponding increase of the RRO in the PES.

19. The method as recited in claim 18, further comprising:
incrementally reducing the second coefficients until reaching a target amount of RRO in the PES; and
allowing the first coefficients to adapt after each incremental reduction of the second coefficients.

20. A method of operating a disk drive, the disk drive comprising a head actuated over a disk comprising a plurality of spiral tracks, each spiral track comprising a high frequency signal interrupted at a predetermined interval by a sync mark, the method comprising:
using the head to read the spiral tracks to generate a read signal representing spiral track crossings;
generating a position error signal (PES) in response to the spiral track crossings;
adjusting the PES based on first coefficients of a first sinusoid in order to cancel at least part of a repeatable runout (RRO) in the PES;
generating position feed-forward compensation values in response to the PES by generating second coefficients of a second sinusoid; and
servoing the head over the disk in response to the adjusted PES and the position feed-forward compensation values to cause the head to follow at least part of the RRO in the PES.

21. The method as recited in claim 20, further comprising generating the first sinusoid according to:

$$a1\cos\left(\left(2\pi\cdot\left(\frac{k}{N}\right)\right)+\left(2\pi\cdot\frac{r}{r_1}\right)\right)+b1\sin\left(\left(2\pi\cdot\left(\frac{k}{N}\right)\right)+\left(2\pi\cdot\frac{r}{r_1}\right)\right)$$

where:
a1 and b1 are the first coefficients;
k is the kth spiral track out of N spiral tracks;
r is the radial location of the head; and
$r_1$ represents a part of the radius of the disk spanned by a complete revolution of the spiral tracks.

22. The method as recited in claim 20, further comprising:
generating timing feed-forward compensation values in response to the second coefficients of the second sinusoid; and
using the timing feed-forward compensation values to open a demodulation window at each spiral track crossing, wherein the timing feed-forward compensation values compensate for the RRO in the PES.

23. The method as recited in claim 20, further comprising reducing the second coefficients and adapt the first coefficients to account for a corresponding increase of the RRO in the PES.

24. The method as recited in claim 23, further comprising:
incrementally reducing the second coefficients until reaching a target amount of RRO in the PES; and
allowing the first coefficients to adapt after each incremental reduction of the second coefficients.

25. A disk drive comprising:
a disk comprising a plurality of spiral tracks, each spiral track comprising a high frequency signal interrupted at a predetermined interval by a sync mark;
a head actuated over the disk; and
control circuitry operable to:
estimate an offset $r_0$ representing a difference between an axial rotation of the disk and an axial rotation of the spiral tracks;
use the head to read the spiral tracks to generate a read signal representing spiral track crossings;
generate a position error signal (PES) in response to the spiral track crossings;
servo the head over the disk in response to the PES;
generate timing feed-forward compensation values in response to the estimated offset $r_0$; and
use the timing feed-forward compensation values to open a demodulation window at each spiral track crossing, wherein the timing feed-forward compensation values compensate for a repeatable runout (RRO) of the spiral tracks.

26. A method of operating a disk drive, the disk drive comprising a head actuated over a disk comprising a plurality of spiral tracks, each spiral track comprising a high frequency signal interrupted at a predetermined interval by a sync mark, the method comprising:
estimating an offset $r_0$ representing a difference between an axial rotation of the disk and an axial rotation of the spiral tracks;
using the head to read the spiral tracks to generate a read signal representing spiral track crossings;
generating a position error signal (PES) in response to the spiral track crossings;
servoing the head over the disk in response to the PES;
generating timing feed-forward compensation values in response to the estimated offset $r_0$; and
using the timing feed-forward compensation values to open a demodulation window at each spiral track crossing, wherein the timing feed-forward compensation values compensate for a repeatable runout (RRO) of the spiral tracks.

* * * * *